United States Patent Office 3,056,805
Patented Oct. 2, 1962

3,056,805
1,5,9-CYCLODODECATRIENYL-SUCCINIC
ANHYDRIDE
Anthony H. Gleason, Scotch Plains, N.J., assignor to Esso Research and Engineering Company, a corporation of Delaware
No Drawing. Filed Mar. 2, 1959, Ser. No. 796,205
15 Claims. (Cl. 260—346.8)

The present invention relates to new compositions of matter and to methods of preparation of these new compositions of matter. More particularly, this invention relates to the preparation of new composition of matter 1,5,9-cyclododecatrienyl succinic anhydride and to the preparation of polymeric adducts of maleic anhydride and 1,5,9-cyclododecatriene. Most particularly, this invention relates to thermally reacting these materials at controlled temperatures in the presence of a controlled amount of a solvent for the maelic anhydride.

The 1,5,9-cyclododecatriene starting material of this invention is known in the art, being prepared by trimerizing butadiene with alkyl metal type catalysts, its preparation and description being described for example in Angewante Chemie, volume 69, No. 11: 397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the formulas below.

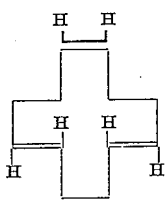  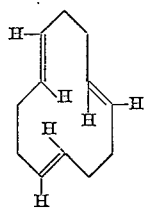

Cis., tr., tr., M.P., −18° C.    Tr., tr., tr., M.P., 34° C.

Throughout this specification it will be assumed that either of the isomers above represented or of the other isomers may be utilized or mixtures thereof.

The present invention 1,5,9-cyclododecatrienyl succinic anhydride will be useful in the preparation of alkyd resins. In the preparation of these materials controlled gelling properties are very useful. By judiciously mixing the present invention higher molecular weight unsaturated anhydride with phthalic anyhdride excellent properties should be obtained. Additionally, superior drying properties should result from the unsaturation present. As is well known in these alkyd resins the obtaining of the desired amount of crosslinking is an important part of obtaining, for example, the setting up of these esters into films.

The present invention 1,5,9-cyclododecatrienyl succinic anhydride also will be useful in the formation of linear polyesters with a glycol due to its difunctionality. These linear polyesters are particularly useful in laminate plastics and in protective coatings. Additionally, 1,5,9-cyclododecatrienyl succinic anhydride and the other polymeric adducts of this invention will find use as plasticizers in the form of their simple esters in plastics and in synthetic rubber.

It has now been surprisingly discovered that maleic anhydride can be reacted under controlled conditions with 1,5,9-cyclododecatriene so as to obtain relatively high yields of a simple 1:1 adduct, 1,5,9-cyclododecatrienyl succinic anhydride, rather than merely a smear of polymeric materials. Thus, from the prior art one would except that the trifunctionality of cyclododecatriene would result in the formation mainly of higher molecular weight material. It has now been found that relatively high yields in the order of 50 wt. percent of 1,5,9-cyclododecatrienyl succinic anhydride can be obtained by using large excesses of CDT, low temperatures, and high dilutions of maleic anhydride in a diluent.

To obtain preferentially cyclododecatriene succinic anhydride, 1,5,9-cyclododecatriene and maleic anhydride are reacted at temperatures of 170–190° C., preferably 175–185° C. and pressures of 5 to 50 atmospheres in the presence of a diluent, the mole ratios of cyclododecatriene to maleic anhydride being in the range of 10 to 1 to 5 to 1 and the diluent being added in mole ratios of 20 to 1 to 6 to 1 diluent to maleic anhydride. It is preferred to limit the reaction times in the range of 15 to 30 hours. Times in the lower part of this range are, of course, preferred for temperatures in the upper part of the temperature range. It is also preferred to use small amounts of an antioxidant such as aromatic amines or phenolic compounds. Specifically, ditertiary butyl cresol, tertiary butyl catechol, and beta phenyl napthylamine may be used as antioxidants. Suitable diluents are aromatic solvents such as benzene, toluene and xylene and ethers such as dioxane, tetrahydrofuran and ethyl ether. Using an excess of cyclododecatriene and a diluent as described above at 200° C., conversions of maleic anhydride were found to be quantitative. By operating to obtain preferentially cycylododecatrienyl succinic anhydride (a viscous pale yellow liquid boiling at 180° C. at 1.3 mm. pressure) 50% yields of material are obtained. Additionally, yields of the crystalline high molecular weight material (average molecular weight 1050) are reduced from about 57% to approximately 30%.

To obtain larger amounts of the higher molecular weight materials in the range of average molecular weights of 450 to 1500, it is preferred to utilize reaction conditions as follows: temperatures of 170–200° C., pressures of 5 to 50 atmospheres, mole ratios of cyclododecatriene to maleic anhydride of 1 to 1 to 2 to 1 and mole ratios of diluent to maleic anhydride of 0 to 1 to 4 to 1.

Regardless of the reaction conditions utilized within the ranges described above, the product from the reaction is found to be comprised of a crystalline material having a molecular weight of about 1050 and a soluble amorphous fraction. This amorphous fraction contains a mixture of the 1 to 1 adduct, i.e. cyclododecatrienyl succinic anhydride and an intermediate molecular weight material having an average molecular weight of about 500. The molecular weights of 1,5,9-cyclododecatrienyl succinic anhydride and the intermediate molecular weight material were determined in parabromo toluene while the high molecular weight material determination was made in nitrobenzene. It was also found that the 1 to 1 adduct was easily separable from the fraction by distillation. Cyclododecatrienyl succinic anhydride was found to be soluble in chloroform, carbon tetrachloride and ether, the intermediate molecular weight material was found to be insoluble in carbon tetrachloride and ether but soluble in chloroform, and the high molecular weight material was found to be insoluble in all of these and was only soluble in materials such as acetone or nitrobenzene.

The present invention will be more clearly understood from a consideration of the following laboratory experiments which help to define the reaction conditions utilized to obtain preferentially cyclododecatrienyl succinic anhydride or higher molecular weight materials.

Example 1

| No. | Temp., °C. | Time, hrs. | CDT¹/MA | Dil.¹/MA | Conv.,² percent | Solids,³ percent | Cyclododecatriene, maleic anhydride runs |
|---|---|---|---|---|---|---|---|
| 80 | 200 | 8 | 3 | 0 | 100 | | No diluent except CDT. |
| 84 | 200 | 8 | 3 | 4.6 | 100 | 56 | |
|    | 160 | 10 |   |     |     |    | |
| 99 | 180 | 4 | 3 | 4.6 | Inc. | 20 | |
|    | 200 | 4 | 3 |     |     |    | |
| 106 | 200 | 4 | 3 | 4.6 | 100 | 23 | 3% dibutylamine added. |
|     | 190 | 20 | 3 |    |     |    | |
| 111 | 200 | 20 | 3 | 4.6 | 100 | 56 | |
| 123 | 190 | 24 | 4 | 10 | 100 | 31 | Approx. 40% simple adduct recov. |
| 127 | 185 | 24 | 3.2 | 8 | 95 | 0 | Approx. 50% simple adduct recov. |
| B   | 185 | 24 | 3.2 | 8 | 95 | 15 | |
| C   | 190 | 24 | 3.2 | 8 | 100 | 33 | |
| 128 | 190 | 24 | 3.2 | 8 | 100 | 39 | |
| B   | 185 | 65 | 3.2 | 8 | 100 | 37 | |
| C   | 185 | 24 | 3.2 | 8 | 100 | 21 | |

¹ Mole ratios. Diluent used equals benzene (plus excess CDT).
² Conversion based on 1:1 adduct.
³ Solids separated from crude reaction product after allowing to cool overnight to room temperature. Solids entirely polymeric material (MW>260) #127 didn't cool for as long a time. All runs contained 2% ditertiary butyl cresol based on anhydride (MA).

Based on runs 84 and 111 yields of solid polymers at 200° C. would seem to be too high if best yield of simple adduct is desired.

At 190° C. (24 hours) and 185° C. (65 hours) solid polymer yields are intermediate (127c and 128).

At 185° C. and 24 hours solid polymer yields appear to be lowest (127a and b, 128c).

Di-n-butyl amine apparently reduces the yield of solid polymer (106) perhaps due to a reduction in pH.

Runs 80 and 99 are of no significance.

From run 123 on conversions to simple adduct were 40% or better. Yields of recovered adduct might have been 5–10% higher if partial separation by solvent extraction had been used before distillation (to remove major portion of higher polymers).

What is claimed is:

1. The composition of matter 1,5,9-cyclododecatrienyl succinic anhydride.

2. The process for preparing a material selected from the group consisting of 1,5,9-cyclododecatrienyl succinic anhydride and polymeric adducts of 1,5,9-cyclododecatriene and maleic anhydride, said adducts having molecular weights below 1500 which comprises reacting 1,5,9-cyclododecatriene with maleic anhydride utilizing mole ratios of the former to the latter of 1 to 1 to 10 to 1 at temperatures of 170 to 200° C. and pressures of 5 to 50 atmospheres.

3. The process of claim 2 in which additionally a diluent selected from the group consisting of aromatic hydrocarbons and ethers is utilized and in which mole ratios of diluent to maleic anhydride are no more than 20 to 1.

4. The process for preparing 1,5,9-cyclododecatrienyl succinic anhydride which comprises reacting 1,5,9-cyclododecatriene with maleic anhydride at temperatures of 170 to 190° C. and pressures of 5 to 50 atmospheres in the presence of a diluent selected from the group consisting of aromatic hydrocarbons and ethers, the mole ratios of 1,5,9-cyclododecatriene to maleic anhydride being in the range of 10 to 1 to 5 to 1 and the mole ratios of diluent to maleic anhydride being in the range of 20 to 1 to 6 to 1.

5. The process of claim 4 in which the diluent is benzene.

6. The process of claim 4 in which the diluent is dioxane.

7. The process of claim 4 in which temperatures utilized are in the range of 175° C. to 185° C.

8. The process of claim 7 in which reaction times are in the range of 15 to 30 hours.

9. The process for preparing polymeric adducts of 1,5,9-cyclododecatriene and maleic anhydride, said adducts having average molecular weights in the range of 450 to 1500 which comprises reacting these materials at temperatures of 170° to 200° C. and pressures of 5 to 50 atmospheres utilizing mole ratios of cyclododecatriene to maleic anhydride of 1 to 1 to 2 to 1.

10. The process of claim 11 in which the diluent is benzene.

11. The process of claim 9 in which additionally a diluent selected from the group consisting of aromatic hydrocarbons and ethers is utilized in mole ratios of diluent to maleic anhydride of no more than 4 to 1.

12. The process of claim 2 wherein the cyclododecatriene and maleic anhydride are reacted in the presence also of an antioxidant selected from the group consisting of ditertiary butyl cresol, tertiary butyl catechol and beta phenyl naphthylamine.

13. The process of claim 4 wherein the cyclododecatriene and maleic anhydride are reacted in the presence also of an antioxidant selected from the group consisting of ditertiary butyl cresole, tertiary butyl catechol and beta phenyl naphthylamine.

14. The process of claim 9 wherein the cyclododecatriene and maleic anhydride are reacted in the presence also of an antioxidant selected from the group consisting of ditertiary butyl cresol, tertiary butyl catechol and beta phenyl naphthylamine.

15. The reaction product of 1,5,9-cyclododecatriene and maleic anhydride, said reaction product having a molecular weight in the range of 450–1500 and being prepared by reacting 1,5,9-cyclododecatriene with maleic anhydride at a temperature of 170–200° C. at a pressure of 5–50 atmospheres, employing a mole ratio of cyclododecatriene to maleic anhydride of 1:1 to 2:1.

No references cited.